United States Patent [19]
Pearson et al.

[11] Patent Number: 5,991,408
[45] Date of Patent: Nov. 23, 1999

[54] IDENTIFICATION AND SECURITY USING BIOMETRIC MEASUREMENTS

[75] Inventors: Peter Kelley Pearson, Livermore; Thomas Edward Rowley, San Jose; Jimmy Ray Upton, Mountain View, all of Calif.

[73] Assignee: Veridicom, Inc., Santa Clara, Calif.

[21] Appl. No.: 08/857,642

[22] Filed: May 16, 1997

[51] Int. Cl.[6] ................................................. H04L 9/00
[52] U.S. Cl. ............................ 380/23; 380/25; 382/116
[58] Field of Search ................................ 380/23, 25, 30; 382/115–119

[56] References Cited

U.S. PATENT DOCUMENTS

| | | | |
|---|---|---|---|
| 4,438,824 | 3/1984 | Meuller-Schloer | 380/30 |
| 4,993,068 | 2/1991 | Piosenka et al. | 380/23 |
| 5,229,764 | 7/1993 | Matchett et al. | 340/825.34 |
| 5,280,527 | 1/1994 | Gullman et al. | 380/23 |
| 5,384,846 | 1/1995 | Berson et al. | 380/23 |
| 5,469,506 | 11/1995 | Berson et al. | 380/23 |
| 5,473,144 | 12/1995 | Mathurin, Jr. | 235/380 |
| 5,509,083 | 4/1996 | Abtahi et al. | 382/124 |
| 5,541,994 | 7/1996 | Tomko et al. | 380/30 |
| 5,581,630 | 12/1996 | Bonneau, Jr. | 382/116 |
| 5,598,474 | 1/1997 | Johnson | 380/23 |
| 5,680,460 | 10/1997 | Tomko et al. | 380/23 |

OTHER PUBLICATIONS

Hopcroft, J. et al., "Introduction to Automata Theory, Languages, and Computation", Chapter 3, Adisson–Wesley Publishing Co., Massachusetts (1979), pp. 320–376.

Aho, A. et al., "The Design and Analysis of Computer Algorithms", Chapters 10 and 11, Addison–Wesley Publishing Co., Massachusetts (1974), pp. 364–425.

*Primary Examiner*—Salvatore Cangialosi
*Attorney, Agent, or Firm*—Skjerven, Morrill, MacPherson, Franklin & Friel LLP; Alan H. MacPherson; Elaine H. Lo

[57] ABSTRACT

The present invention makes it possible for a user to have a security key created from one or more biometric elements of the user, such as a fingerprint. For example, a biometric feature or combination of biometric features of the user can be used to create an instance of a problem which can only be solved by data inherent in the biometric feature or combination of biometric features. The user can supply the data to solve the problem by inputting, through an appropriate input device, an image, or other representation of the biometric elements from which the data that will solve the instance of the problem is derived. If problem is solved, either completely or partially, using the derived data then the identity of the user can either be verified or ascertained. the solution can then be used for other purposes such as the generation of a cryptographic key.

22 Claims, 5 Drawing Sheets

IDENTIFICATION AND SECURITY USING BIOMETRIC MEASUREMENTS

FIELD OF THE INVENTION

The present invention relates to systems and methods for using a biometric element to create a secure identification and verification system, and more specifically to an apparatus and a method for creating a hard problem which has a representation of a biometric element as its solution.

DESCRIPTION OF RELATED ART

The identification or authentication of individuals is a problem that people and organizations must confront on a daily basis. A variety of systems and methods are currently used to protect information and property from unauthorized access or interference. These protection systems and methods include but are not limited to conventional keys, magnetic keys, magnetic strips on cards, "smart cards," Personal Identification Numbers (PINs), and passwords.

Each of these systems depends on a piece of critical information or a physical access device for access to be gained. As long as the critical information or access device is retained by the rightful user, access by others will be deterred. However, if the critical information or access device is secured from the rightful owner whether by theft, fraud, duress, surveillance, or consent, someone other than the rightful user could obtain access to the secure information or property.

Beyond maintaining information in a secure area through locks or password protection, it is often desirable to store or transmit information in an encrypted format so that even if the information falls into the hands of an unauthorized user, it cannot be accessed without the cryptographic key. Even while encryption allows sensitive information to be securely transmitted or stored in publicly accessible areas, encryption suffers from the same short comings of those security methods discussed above. If the cryptographic key is lost, stolen, or given away then unauthorized users may have access to the encrypted information. Since an encryption key cannot be easily memorized by the user like a PIN number or a combination to a lock, the encryption key must typically be stored in some physical medium. This leaves it vulnerable to misappropriation.

What is needed is a security method which has a key that cannot be easily misappropriated yet is convenient for the user to carry. Additionally, the lock should be difficult to open without the key, and preferably, once the lock is opened, the solution should be able to be used to generate a cryptographic key so that encrypted information can be obtained by the user.

SUMMARY OF THE INVENTION

The present invention makes it possible for a user to have a security key created from one or more biometric elements of the user, such as a fingerprint. For example, a feature or combination of features of the user can be used to create an instance of a problem which can only be solved by data inherent in the biometric feature or combination of features. The user can supply the data to solve the problem by inputting, through an appropriate input device, an image, or other representation of the biometric elements from which the data that will solve the instance of the problem is derived. The problem is solved, either completely or partially, using the derived data to verify the identity of the user, or to provide other functions.

One embodiment of the present invention works as follows. A user is enrolled through an enrollment system which is preferably in a secure location. The user biometric element that will serve as the key is sampled by an appropriate sensor. Any biometric element can be used, including a fingerprint, a palm print, a retinal scan, a picture of the user, or a combination of these elements from one or more users.

If the system is set up to use a fingerprint then the user will have the designated fingerprint scanned into the system through a fingerprint sensor. This process can be as simple as the user pressing a finger on a sensor pad. The sensor pad then inputs a representation of the fingerprint into a computer system. The representation of the fingerprint is then used to construct an instance of a problem which has data derived from the fingerprint as its solution. Preferably the instance of the problem is difficult to solve without knowledge of the fingerprint.

The instance of the problem is then associated with the identity of the user or users from which it was generated. To ensure the reliability of the system's ability to correctly identify users, it may be desirable to allow only known secure systems to generate instances of problems. The identification of an instance of a problem as corresponding to a particular user or users may be only as reliable as the process used at the enrollment system to identify the user or the security of the system used to generate the instance of the problem identified with the user.

According to one aspect of the present invention, a code or feature can be inserted into the instance of the problem in order to serve as proof that the instance of the problem was generated in a secure fashion by a secure system or that it is otherwise reliable and uncorrupted. According to another aspect of the present invention, a cryptographic key can be generated from the user's fingerprint and used to encrypt information.

Another embodiment of the present invention works as follows. A security system, access point controller, or any other device that may be used to restrict access has a user processing system in accordance with the present invention. The user processing system has a sensor that will obtain a representation of the appropriate biometric element from the user. In the example given above using a fingerprint, the sensor is a fingerprint sensor. The user presses the appropriate finger against the sensor and the sensor obtains a representation of the fingerprint. The representation of the fingerprint is encoded into a format that can be used by the computer, and it is checked against an instance of the problem.

There are a number of ways to determine which instance or instances of the problem the representation of the fingerprint should be checked against. According to one embodiment, the user tells the processing system who the user claims to be and the processing system downloads, from a central location, a magnetic strip on a card provided by the user, or any other location, the instance of the problem identified with that person. The processing system then attempts to solve the instance of the problem using the encoded version of the user's fingerprint. According to another embodiment, the processing system can access a database of instances of the problem and determine which if any of the instances of the problem the encoded version of the user's fingerprint solves. If an instance of the problem is solved then the user's identity is determined to be the identity associated with the instance of the problem solved by the user's fingerprint.

According to another aspect of the present invention, if the user's fingerprint only partially solves the instance of the problem then this partial solution is used to reduce the work required to find a more complete partial solution. A user's fingerprint may only partially solve the instance of the problem associated with the user for any reason, including dirt masking a portion of the fingerprint or sensor, a faulty sensor, variations in how the fingerprint is read by the sensor, or the intrinsic variability of biometric elements. According to this aspect of the invention, a more complete partial solution can be found despite variability or errors in sensors or in representations of a user's fingerprint.

According to another aspect of the present invention, if the processing system solves the instance of the problem then a cryptographic key can be generated from the solution to the instance of the problem or from the user's fingerprint. This cryptographic key can be used to decrypt information meant for the user. For example, if the processing system is used to control access to a computer, the contents of the computer's hard disk can be also be encrypted. The user gains access to the computer by pressing the appropriate finger against a sensor on the computer connected to the processing system. The processing system then also generates the cryptographic key used to decrypt the contents of the computer. For example, the cryptographic key can be used to decrypt the contents of a computer's hard disk or RAM memory.

The present invention provides a number of advantages. The user's key is the solution or a partial solution to instance of the problem. Since the user's key is constructed from the user's biometric elements, the user does not have to remember any information or carry a physical key or device, and the key cannot be easily stolen without the user's knowledge. Additionally, the user cannot easily give the key to another for unauthorized use outside the user's presence.

Another advantage of the present invention is that the instance of the problem solved by the user's key can be made as difficult as desired by the those who implement the system, making solving the problem without the key a practical impossibility. Yet another advantage of the present invention is that the degree of partial solution required by the system can be made as close to a full solution as desired by those who implement the system, making obtaining the required degree of partial solution as difficult as desired by those who implement the system.

Still another advantage of the present invention is that the system and method can be used to correct for or overcome variations in the biometric element or the representation of the biometric element by using the representation of the biometric element as an approximation to the solution to the instance of the problem. A more complete solution is then found using the approximation of the solution. A further advantage of the present system is that the solution or partial solution to the problem can itself be used to generate a cryptographic key which can be used to retrieve encrypted information of any type.

Thus, the present invention can be characterized as having two separate components. An enrollment system or method in which users are enrolled in the security system, and a processing system or method in which a user's identity is checked by the system.

The system or method for enrolling a user in a biometric based verification system can be characterized as follows. A representation of a biometric element of the user is received. The representation includes a plurality of features. The plurality of features are used to produce an instance of a problem. The instance of the problem is then output to a memory location from which it can be retrieved. The instance of the problem can be stored in a centralized location available to the public, on a smart card, on the magnetic strip of a credit card, or in any other suitable location.

According to one aspect of the invention the instance of the problem is produced by encoding features in the plurality of features into a plurality of encoded features. According to another aspect of the invention the step of producing the instance of the problem includes camouflaging the encoded features in the instance of the problem.

According to still another aspect of the present invention, the user biometric element comprises pieces from more than one person, so that more than one person's presence is required to solve the instance of the problem.

According to yet another aspect of the invention identifying features in the plurality of features in the instance of the problem requires that a hard problem be solved. The hard problem can be an NP hard problem, preferably an NP complete problem, or most preferably an exponentially hard problem to solve. A description of problem solving, complexity, and NP, NP-hard, NP-complete, and exponential time problems can be found in the book "Computers and Intractability" by M. R. Garey and D. S. Johnson (1979). This book is incorporated by reference.

According to another aspect of the present invention identifying features in the plurality of features in the instance of the problem requires that a clique be found in a graph. According to still another aspect of the present invention identifying features in the plurality of features in the instance of the problem requires that a subset of elements of a larger set of element be identified wherein the elements in the subset satisfy a predetermined condition. According to another aspect of the present invention the predetermined condition the elements of the subset must satisfy includes the condition that the sum of numerical values assigned to elements of the subset is equal to a predetermined number.

According to another aspect of the present invention at least a portion of the biometric element comprises an element of a fingerprint, and the plurality features comprise an element of a plurality of minutiae.

In another embodiment of the present invention a system and method for processing a user in a biometric based system includes storing in a memory information comprising an instance of a problem based on features in the plurality of features. According to another aspect of the present invention a representation of a user biometric element is received. The representation includes a plurality of user features. In another aspect of the present invention it is determined if the user features in the plurality of user features partially solve the instance of the problem.

In yet another aspect of the present invention user features in the plurality of user features are used to identify a partial solution to the instance of the problem. The partial solution is then used to obtain a more complete partial solution.

According to another aspect of the invention solving the instance of the problem requires that a hard problem be solved. The hard problem can be an NP hard problem, preferably an NP complete problem, or most preferably an exponentially hard problem to solve. According to yet another aspect of the present problem the instance of the problem requires that a clique be identified in a graph.

According to another aspect of the present invention at least a portion of the user biometric element comprises an element of a fingerprint, and the plurality features comprise a plurality of minutiae of the fingerprint. According to still another aspect of the present invention the solution or a partial solution to the problem is used to create a key. Preferably the key is a cryptographic key. According to still another aspect of the present invention the plurality of user biometric elements are used to provide evidence that a solution or a partial solution to the instance of the problem has been found. Preferably providing evidence that a solution or a partial solution to the instance of the problem has been found is through the use of zero knowledge proof of knowledge.

DETAILED DESCRIPTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the invention. Thus, the present invention is not intended to be limited to the embodiments disclosed, but is to be accorded the widest scope consistent with the principles and features disclosed herein.

Figure 1:
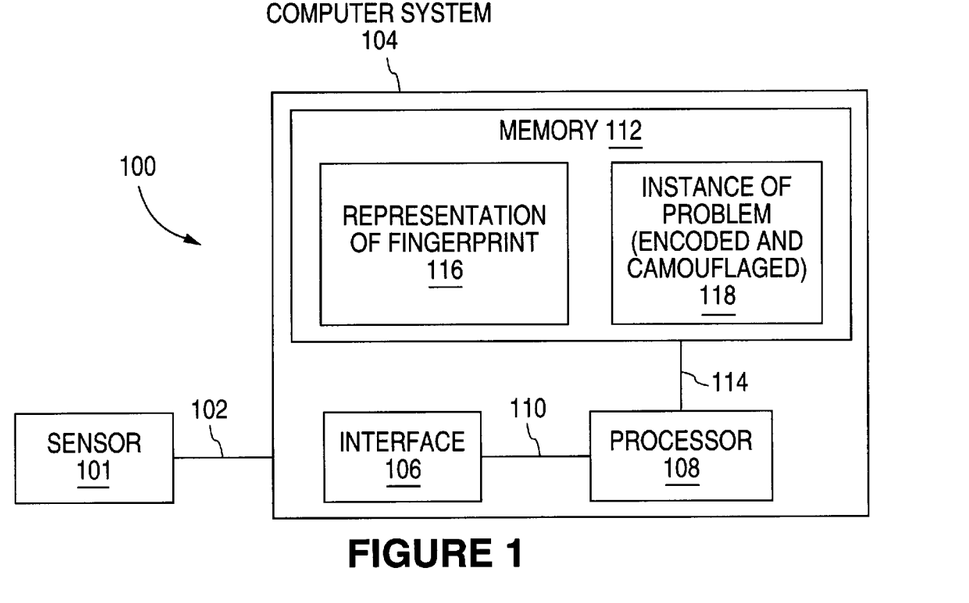
FIG. 1 is a block diagram illustrating a system to enroll users in accordance with an aspect of the present invention.

FIG. 1 is a diagram illustrating enrollment system 100. Enrollment system 100 is preferably a secure system. Enrollment system 100 includes sensor 101 which produces a representation of a biometric element such as fingerprints, retinas, palm prints, irises, faces, signature, or any other biometric element. Although only one sensor is shown in FIG. 1, any number of sensors could be connected to the system in any combination allowing biometric features from more than one portion of a single body or more than one body to be used. Sensor 101 generically represents any type of sensor including a camera, a fingerprint sensor, a laser based sensor, a pressure sensor to detect a written signature, or any other type of sensor that can be used to detect a biometric element. Examples of sensors are described in U.S. patent application No. 08/573,100, entitled "Fingerprint Acquisition Sensor," inventors: Alexander G. Dickinson, Ross McPherson, Sunetra Mendis and Paul C. Ross, filed Dec. 15, 1995, and U.S. Application entitled "Capacitive Fingerprint Sensor with Adjustable Gain," inventors: Alexander G. Dickinson, Ross McPherson, Sunetra Mendis and Paul C. Ross, filed May 13, 1997. Both applications are commonly owned with the present application and both applications are incorporated by reference Sensor 101 is connected to input-output line 102 which is itself connected to computer system 104. Computer system 104 includes interface 106 and processor 108 connected by interface-processor bus 110. Memory 112 is connected to processor 108 by memory-processor bus 114.

Computer system 104 generically represents any type of computer system, such as a microprocessor-based system, a mainframe system, or any other type of general or special purpose computing system which includes an interface, a processor, and a memory. Processor 108 is any type of processor such as a microprocessor, dedicated logic, a digital signal processor, a programmable gate array, a neural network, or a central processor unit implemented in any other technology. Stored in memory 112 is representation of fingerprint 116 (or any other biometric element) and instance of problem 118.

Representation of fingerprint 116 is input to computer system 104 through input-output line 102 and stored in memory 112. As described below, representation of fingerprint 116 is encoded and camouflaged in instance of problem 118 which is stored in memory 112. Instance of problem 118 is then output to a location from which it can be retrieved for future use.

Figure 2:
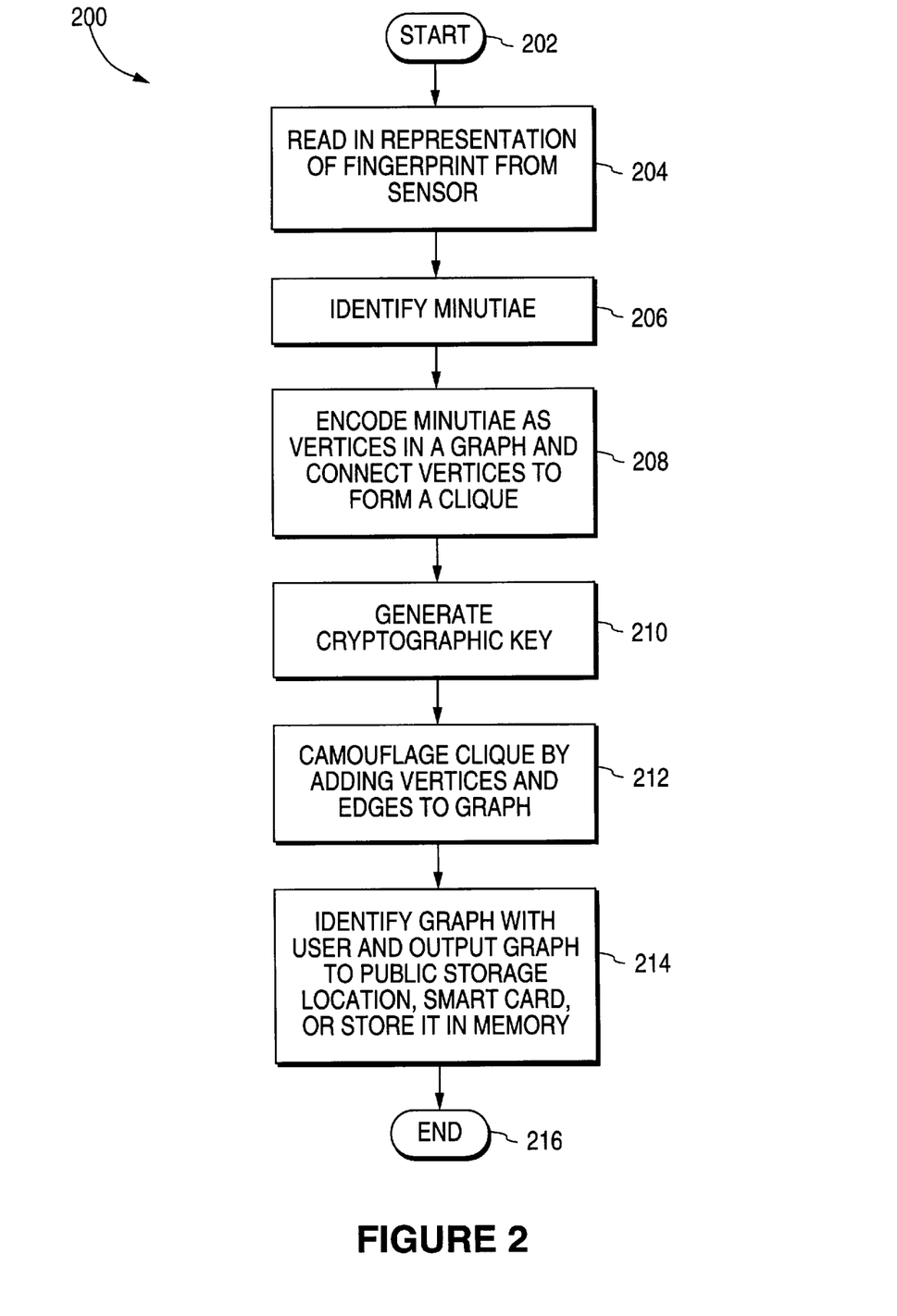
FIG. 2 is a flow chart illustrating the sequence of operations involved in enrolling a user in accordance with an aspect of the present invention.

FIG. 2 is a flow chart of the sequence of operations involved in enrolling a user in the enrollment system in accordance with an aspect of the present invention. Enrollment flowchart 200 starts at step 202, which is the start state. This system next proceeds to step 204.

At step 204, representation of fingerprint 116 is read from sensor 101 into computer system 104 through input-output line 102. The system then proceeds to step 206. In step 206, the minutiae present in representation of fingerprint 116 are identified. The system then proceeds to step 208.

Figure 3A:
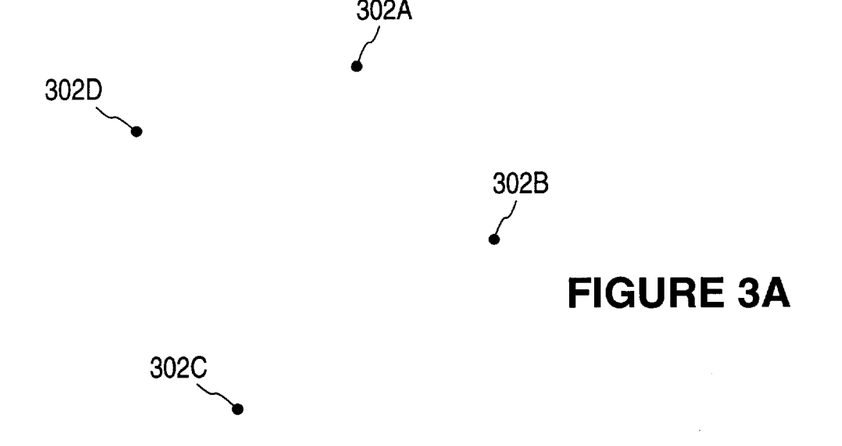
FIG. 3 is a diagram illustrating a simplified example of a fingerprint encoded as vertices in a graph, vertices forming a clique, and camouflaging of the clique with camouflage vertices and edges.
Figure 3B:
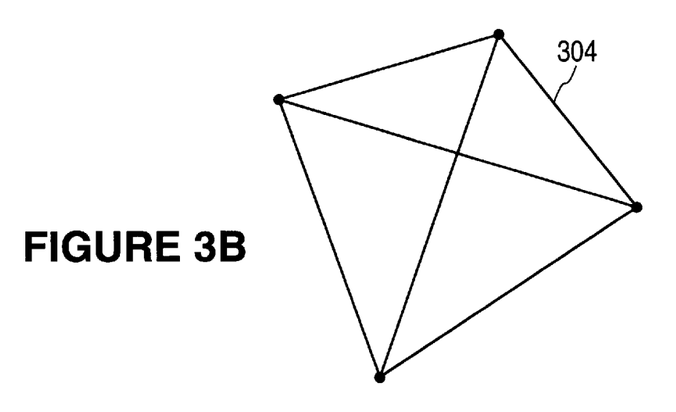

In step 208, the minutiae identified in step 206 are encoded as vertices in a graph. The minutiae are encoded by representing them by their relative locations in representation of fingerprint 116. For purposes of illustration, a graph with 4 vertices 302 A–D is shown in FIG. 3a. In FIG. 3b, the vertices in the graph are then connected by edges 304 to form a clique. In one embodiment of the present invention the connections of the vertices are represented in memory 112 by an N×N matrix in which N is the number of vertices. If two vertices are connected then a "1" is placed in the array at the intersection of the row and column representing the two vertices. If there is no connection then a "0" is placed at the intersection. At this stage, since all of the vertices are connected to form the clique, the array contains only "1"'s.

The system then proceeds to step 210. At step 210 a cryptographic key is generated, if desired, from the vertices of the clique. A cryptographic key can be generated, for example, as a function of the relative distances of specified vertices in the clique from a fixed point in the graph. Any method can be used to generate a cryptographic key as long as the method reliably generates a unique key from the biometric elements of different users. A public key can then be generated and identified as associated with the graph so that encrypted information can be securely sent to the user who knows the location of the clique in the graph. In this embodiment, since the private key is generated from the clique itself, only the user who can identify the clique in the graph can decrypt the encrypted message.

Figure 3C:
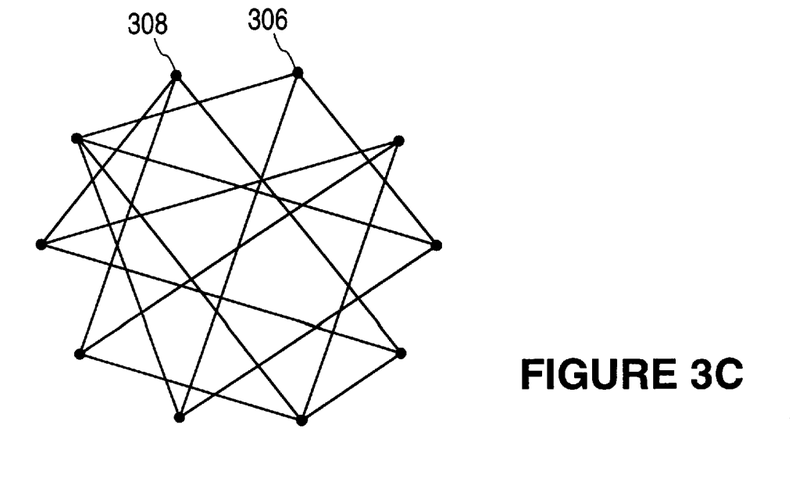

The system then proceeds to step 212. At step 212, the clique is camouflaged through the addition of vertices and edges to the graph. The addition of camouflage vertices 306 and camouflage edges 308 is represented in FIG. 3c. Vertices are added by generating a location for each camouflage vertex and inserting rows and columns in the array at the appropriate locations. Camouflage edges are then generated by placing either a "1" or a "0" in the newly generated rows and columns.

Care must be taken in how the camouflage vertices and edges are added to the graph in order to ensure that the camouflage vertices and edges cannot be discerned from the vertices and edges that form the clique. One way to achieve this result is to randomly place the camouflage vertices in the graph and randomly connect edges to the vertices until each vertex has approximately the same number of edges attached to it.

In order to make it difficult to find the clique camouflaged in the graph at least 5 minutiae should be encoded in the clique and at least 5 camouflage vertices should be generated. Preferably 20 or more minutiae should be encoded in the clique and also preferably 20 or more camouflage vertices should be generated. More preferably 40 or more minutiae should be encoded in the clique and also more preferably 100 or more camouflage vertices should be generated. Even more preferably 60 or more minutiae should be encoded in the clique and also even more preferably 300 or more camouflage vertices should be generated. Most preferably, 60 more minutiae should be encoded in the clique and also most preferably 500 or more camouflage vertices should be generated.

The system next proceeds to step 214. At step 214 the encoded and camouflaged instance of the problem 118 is then output from computer system 104 through input-output line 102 along with the associated public key if one was generated. Encoded and camouflaged instance of problem 118 may be output to a public storage location, a smart card, or retained in memory.

Figure 4:
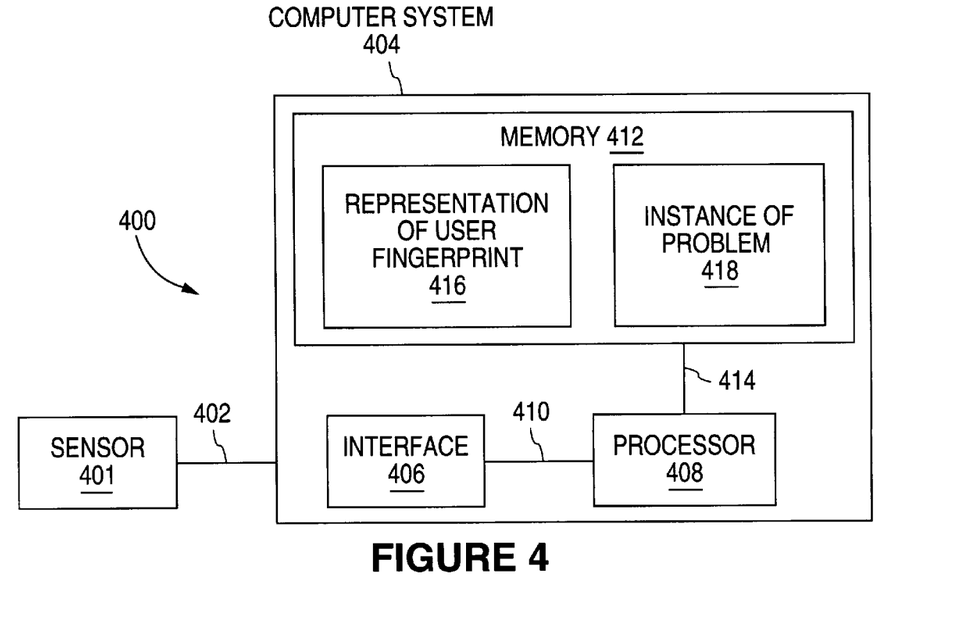
FIG. 4 is a block diagram illustrating a system to process users in accordance with an aspect of the present invention.

FIG. 4 is a diagram illustrating a system to process a user in accordance with one aspect of the present invention. System for processing a user 400 includes a sensor 401 which produces a representation of a biometric element such as images of fingerprints, retinas, palm prints, irises, faces, signature, or any other biometric element. Although only one sensor is shown in FIG. 4, any number of sensors could be connected to the system in any combination allowing biometric features from more than one portion of a single body or more than one body to be used. Sensor 401 generically represents any type of sensor including a camera, a fingerprint sensor, a laser based sensor, a pressure sensor to detect a written signature, or any other type of sensor that can be used to detect a biometric element.

Sensor 401 is connected to input-output line 402 which is itself connected to computer system 404. Computer system includes interface 406 and processor 408 connected by interface-processor bus 410. Memory 412 is connected to processor 408 by memory-processor bus 414. Stored in memory 412 is representation of user fingerprint 416 and instance of problem 418.

Computer system 404 generically represents any type of computer system, such as a microprocessor-based system, a mainframe system, or any other type of general or special purpose computing system which includes an interface, a processor, and a memory. Processor 408 is any type of processor such as a microprocessor, dedicated logic, a digital signal processor, a programmable gate array, a neural network, or a central processor unit implemented in any other technology.

Figure 5:
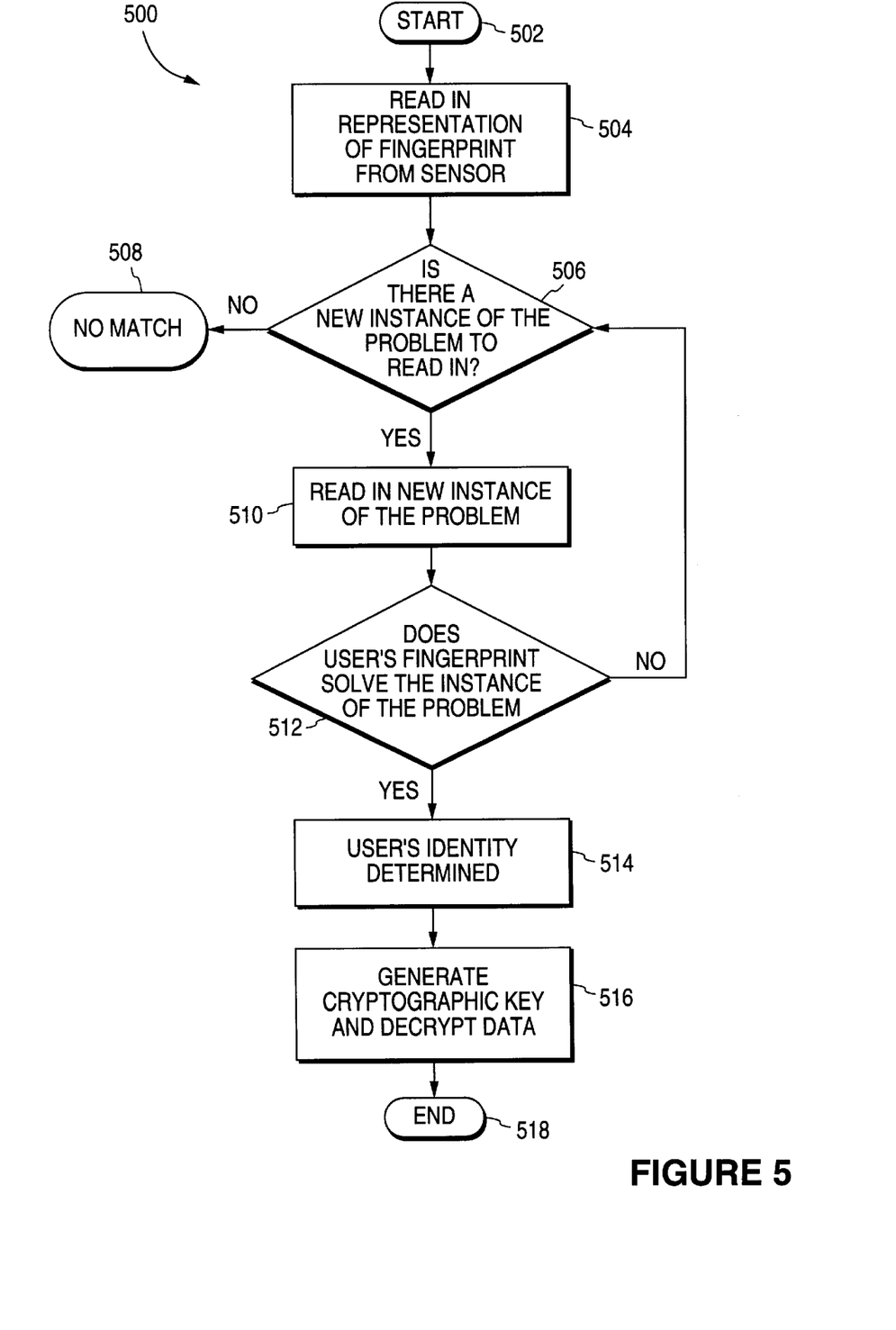
FIG. 5 is a flow chart illustrating the sequence of operations involved in processing a user in accordance with an aspect of the present invention.

FIG. 5 is a flow chart of the sequence of operations involved in processing a user in accordance with an aspect of the present invention. The system starts at step 502, which is the start state. The system next proceeds to step 504. At step 504, representation of user fingerprint 416 is read from sensor 401 into computer system 404 through input-output line 402 and then into memory 412. Representation of fingerprint 416 can be in any form desired. If it is not yet encoded so that it can be matched against an instance of a problem, then processor 408 will encode it as appropriate.

Any method of encoding can be used that will allow representation of fingerprint 416 to be matched against instance of the problem 418. For example, representation of fingerprint 416 is encoded by the same method as described above for the enrollment system.

The system then proceeds to step 506. At step 506 the system determines if there is an instance of the problem 418 against which the system has not yet checked representation of user fingerprint 416. If there is an instance of a problem 418 against which the representation of user fingerprint 416 has not been checked, then a new instance of the problem 418 is read into memory 412. If there is no new instance of the problem 418 to be read in, then the system goes to step 508 and reports no match.

System 400 and method 500 can be used for example, in 2 distinct types of user processing: authentication and identification. For use in authentication, the instance of the problem corresponding to the person the user claims to be is input at step 510. For use in identification, a plurality of instances of a problem are input successively in step 510. The plurality of instances of the problem are preferably chosen so that the user's identity can be determined to correspond to the identity associated with one of the instances of the problem in the plurality of instances of the problem. The system and method of the present invention can also be used to ensure that a user is not on a given list of users. This can be accomplished by, for example, maintaining a database of a plurality of instances of the problem associated with user's who are to be denied access by the system or method.

After step 510 is completed, the system then goes to step 512. At step 512 the system decides if representation of user fingerprint 416 solves instance of problem 418. This is done by determining if the vertices in representation of user fingerprint 416 match any of the vertices in the instance of the problem loaded in step 510. If a match is found then it is determined if the matching vertices form a clique. If they do form a clique then the instance of the problem is solved. If a solution or a partial solution is not found, then the system loops to step 506.

According to another aspect of the present invention the system and method can be used to correct for any variability in a representation of a biometric element from the representation used to create the instance of the problem. This is true whether the origin of the variations is the biometric element itself, a sensor, or any other source or combination of sources. Correction for variations can be accomplished, for example, as follows in the case in which the system or method uses a fingerprint as the biometric element. At step 512 when the system decides if representation of user fingerprint 416 solves instance of problem 418, the system determines which vertices in representation of user fingerprint 416 match vertices in the clique in instance of problem 418. The system then uses the vertices that match to help locate more vertices in the clique in the instance of the problem. In one aspect of the present invention, the system uses other vertices in the representation of user fingerprint 416 to locate more vertices in the clique in instance of problem 418. This is accomplished by determining if vertices in instance of problem 418 which are closest to unmatched vertices in representation of user fingerprint 416 are vertices in the clique in instance of problem 418. Any other technique or algorithm for matching which is commonly known in the art is suitable for this purpose. If after a predetermined time or a predetermined number of vertices in instance of problem 418 have been checked and no further vertices in the clique are found, then the system stops looking for more vertices in the clique in instance of problem 418.

If a solution or a partial solution is found, then step 514 is executed. At step 514 the user is identified as being the person associated with instance of problem 418 loaded in step in step 510. If only a partial solution is found then this is reported. The system can be set so that either partial solutions of a predetermined completeness end the loop between steps 512 and 506, or the system continues to loop until a complete solution is found or there are no new instances of the problem to load in at step 506.

If a solution is found, the system can be used to allow the user access to secure information, a secure area, or use of a device such as a computer or a cellular phone. According to another aspect of the present invention, when the solution is found, the system can attempt to prove to other systems or devices that it has found the solution. This can be achieved by releasing information that only one in possession of the answer would know. More preferable, proof of knowledge of the answer is achieve through the release by system 400 of as little of the answer as is possible consistent with practical constraint such as time required to provide adequate proof and system data rates. Most preferably, the proof of knowledge of the answer by system 400 is accomplished using a zero knowledge proof of knowledge. A description of proofs of knowledge and zero knowledge proofs of knowledge can be found in "Applied Cryptology" by Bruce Schneier. This book is incorporated by reference.

After step 514, the system then proceeds to step 516. At step 516, if it is desired, a private key is generated from the solution to the instance of the problem and can be used to decrypt information encrypted using the public key generated during the enrollment process. The key can be used to decrypt information stored on a computer. The system then goes to step 518 and ends.

Figure 6:
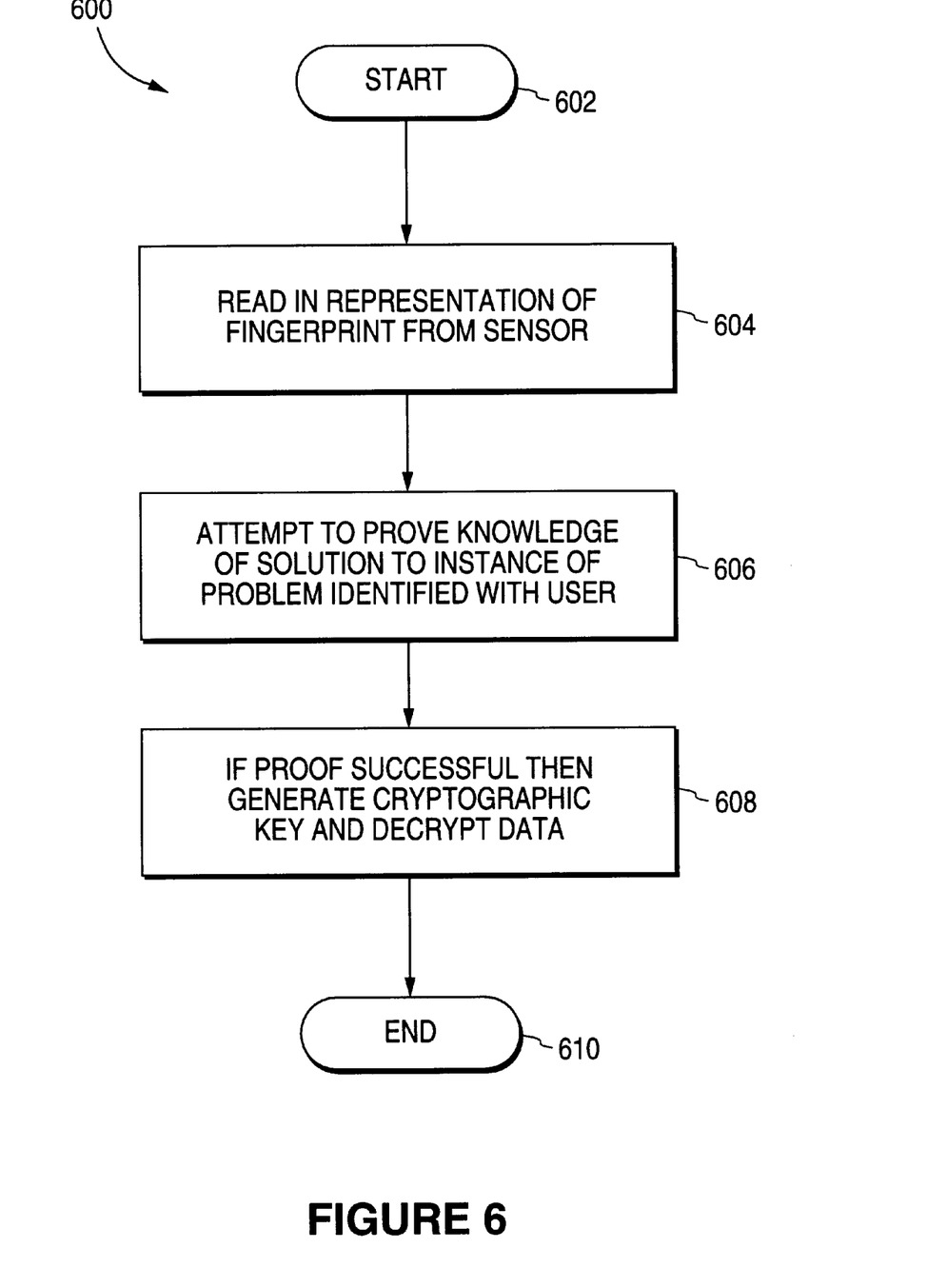
FIG. 6 is a flow chart illustrating the sequence of operations involved in processing a user in accordance with another embodiment of the present invention.

FIG. 6 is a flow chart of the sequence of operations involved in processing a user in accordance with another embodiment of the present invention. The system starts at step 602, which is the start state. The system next proceeds to step 604. In step 604 the system reads into memory 412 representation of user fingerprint 416. Representation of fingerprint 416 can be in any form desired. If it is not yet encoded so that it can be matched against an instance of a problem, then processor 408 will encode it as appropriate.

The system then proceeds to step 606. At step 606 the system attempts to prove it has the answer to the instance of the problem associated with the user. As described above, this can be accomplished in a number of ways, including the use of a zero knowledge proof of knowledge. System 400 will communicate through input-output port 402 with a location that stores the instance of the problem the user's representation of a fingerprint is claimed to solve. In this embodiment, system 400 need not store instance of problem 418 in memory 412. If system 400 successfully provides enough evidence that the user's biometric element solves the instance of the problem, then the user is identified as the user associated with the instance of the problem solved and access to the appropriate information or property is allowed. If enough evidence is not provided the identification fails and access is denied.

The system next proceeds to step 608 where, if the problem was solved, a cryptographic key is generated, if desired, from the solution to the problem. This key can be used as described above. The system then proceeds to step 610 and ends.

The foregoing description of embodiments of the present invention are presented for the purposes of illustration and description only. They are not intended to be exhaustive or to limit the invention to the forms disclosed. Many modifications and variations will be apparent to practitioners skilled in the art. It is intended that the scope of the invention be defined by the following claims and their equivalents.

What is claimed is:

1. A method for enrolling at least a first user in a biometric based verification system, comprising the steps of:
   receiving from a sensor a representation of a biometric element of the first user, the representation including a plurality of biometric features;
   determining a graph representing the relationships between the plurality of biometric features;
   adding a plurality of camouflaging vertices and edges to the graph to create a camouflaged graph; and
   storing the camouflaged graph with a first user identity information, the first user identity information identifying the first user as being the source of the plurality of biometric features.

2. The method of claim 1, wherein the graph includes a plurality of vertices and a plurality of edges, and wherein the determining the graph includes:
   representing biometric features in the plurality of biometric features as vertices in the plurality of vertices;
   connecting vertices in the plurality of vertices with edges in the plurality of edges; and
   wherein the plurality of vertices and the plurality of edges form a clique.

3. The method of claim 1, wherein the camouflage edges in the plurality of camouflage edges are connected to the camouflage vertices in the plurality of camouflage vertices.

4. The method of claim 1, further comprising determining a cryptographic key includes identifying a clique in the graph.

5. The method of claim 1, wherein the biometric element comprises biometric elements from a second user.

6. The method of claim 1, wherein the biometric element comprises an element of a fingerprint.

7. The method of claim 1, wherein the biometric element comprises an element of a plurality of fingerprints.

8. The method of claim 1, wherein the biometric element comprises an element of a palm print.

9. The method of claim 1, wherein the biometric element comprises an element of an iris.

10. The method of claim 1, wherein the biometric element comprises an element of a retina.

11. A method for attempting to identify a user using a biometric based system, the method comprising:
   receiving a representation of a user biometric element from a sensor, the representation including a plurality of user features;
   accessing an instance of a problem, the problem having been created from a plurality of enrollment features, the plurality of enrollment features being previously identified features corresponding to a biometric element, the instance of the problem being at least as difficult to solve as an NP complete problem; and
   attempting to at least partially solve the instance of the problem using user features in the plurality of features, and if the instance of the problem is at least partially solved then the user is identified as being a user associated with the instance of the problem.

12. The method of claim 11, wherein:

the instance of the problem comprises identifying features in the plurality of features, the plurality of features including a plurality of minutia; and wherein the subset of elements satisfies a predetermined condition.

13. The method of claim 12, wherein the predetermined condition is a numerical sum.

14. The method of claim 12, wherein the instance of the problem includes identifying a clique in a graph, wherein the graph represents a plurality of features, and wherein the predetermined condition is a clique in a graph.

15. The method of claim 11, wherein the instance of the problem comprises an NP-hard problem.

16. The method of claim 11, wherein the instance of the problem comprises an exponentially hard problem.

17. The method of claim 11, wherein the user biometric element comprises pieces from more than one person.

18. The method of claim 11, wherein the user biometric element comprises an element of at least one of a fingerprint, a palm print, an element of an iris, and an element of a retina.

19. The method of claim 11, wherein if the problem is solved, then the solution is used to create a cryptographic key for decrypting encrypted information, the encrypted information having been encrypted using a second cryptographic key corresponding to the cryptographic key, the second cryptographic key being created from said plurality of enrollment features.

20. The method of claim 11, including the step of providing evidence that the partial solution to the instance of the problem has been found, wherein the evidence corresponds to using a zero knowledge proof of knowledge.

21. A system for enrolling a user in an identification system, the system comprising:

a sensor for receiving a representation of a biometric element of the user, the representation including a plurality of biometric features;

a memory for storing the representation; and a processor, being coupled to the sensor and the memory; for determining a set of relationships between the plurality of biometric features, the set of relationships corresponding to a graph, the processor further for adding a plurality of camouflaging vertices and edges to the graph to create a camouflaged graph, and the processor further for storing the camouflaged graph with a user identity information, the user identity information identifying the user as being the source of the plurality of biometric features.

22. A system for enrolling a user in an identification system, the system comprising:

a first means for receiving a representation of a biometric element of the user, the representation including a plurality of biometric features;

a second means for storing the representation; and a third means, being coupled to the first means and the second means; for determining a set of relationships between the plurality of biometric features, the set of relationships corresponding to a graph, the third means further for adding a plurality of camouflaging vertices and edges to the graph to create a camouflaged graph, and the third means further for storing the camouflaged graph with a user identity information, the user identity information identifying the user as being the source of the plurality of biometric features.

* * * * *